(12) United States Patent
Nakada et al.

(10) Patent No.: US 12,392,991 B2
(45) Date of Patent: Aug. 19, 2025

(54) OPTICAL SYSTEM AND IMAGE PICKUP APPARATUS HAVING THE SAME

(71) Applicant: CANON KABUSHIKI KAISHA, Tokyo (JP)

(72) Inventors: Takeharu Nakada, Tochigi (JP); Takahiro Hatada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 451 days.

(21) Appl. No.: 17/858,250

(22) Filed: Jul. 6, 2022

(65) Prior Publication Data
US 2023/0020736 A1    Jan. 19, 2023

(30) Foreign Application Priority Data
Jul. 8, 2021    (JP) .................................. 2021-113299

(51) Int. Cl.
*G02B 9/26*    (2006.01)
*G02B 7/04*    (2021.01)

(52) U.S. Cl.
CPC .............. *G02B 9/26* (2013.01); *G02B 7/04* (2013.01)

(58) Field of Classification Search
CPC ... G02B 9/26; G02B 7/04; G02B 7/08; G02B 15/143105; G02B 15/14; G02B 27/646
USPC ................. 359/682, 689–690, 739, 748, 753, 359/784–792, 684, 693, 698, 705, 823
See application file for complete search history.

(56) References Cited

U.S. PATENT DOCUMENTS

| | | | |
|---|---|---|---|
| 9,036,265 B2 | 5/2015 | Hatada | |
| 9,684,155 B2 | 6/2017 | Hatada | |
| 10,120,170 B2 | 11/2018 | Hatada | |
| 10,895,722 B2 | 1/2021 | Hatada | |
| 11,269,165 B2 | 3/2022 | Hatada | |
| 11,314,064 B2 | 4/2022 | Kimura et al. | |

(Continued)

FOREIGN PATENT DOCUMENTS

| | | |
|---|---|---|
| CN | 101852911 A | 10/2010 |
| CN | 103885161 A | 6/2014 |

(Continued)

OTHER PUBLICATIONS

Notice of Reasons for Refusal issued by the Japanese Patent Office on Jul. 2, 2024 in corresponding JP Patent Application No. 2021-113299, with English translation.

(Continued)

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

An optical system includes, in order from an object side to an image side, a first lens unit having a positive refractive power, a diaphragm, a second lens unit having a negative refractive power, and a third lens unit having a positive refractive power. A distance between adjacent lens units is changed during focusing. The second lens unit is moved to the image side during focusing from an object at infinity to (Continued)

a short-distance object. The first lens unit includes a positive lens closest to an object and two or more negative lenses. The second lens unit consists of a single negative lens. A predetermined condition is satisfied.

9 Claims, 9 Drawing Sheets

(56) References Cited

U.S. PATENT DOCUMENTS

| | | | | |
|---|---|---|---|---|
| 2012/0293869 | A1* | 11/2012 | Hayashi | G02B 27/646 |
| | | | | 359/557 |
| 2013/0242175 | A1* | 9/2013 | Kuzuhara | G02B 27/646 |
| | | | | 348/360 |
| 2014/0184887 | A1 | 7/2014 | Yonetani | |
| 2016/0238819 | A1* | 8/2016 | Sun | G02B 13/02 |
| 2017/0351089 | A1 | 12/2017 | Gyoda | |
| 2017/0351113 | A1* | 12/2017 | Inoue | G02B 7/04 |
| 2020/0174234 | A1 | 6/2020 | Katayose | |
| 2020/0257095 | A1 | 8/2020 | Kimura et al. | |
| 2021/0181462 | A1 | 6/2021 | Hatada | |
| 2022/0146801 | A1 | 5/2022 | Hatada | |
| 2022/0244508 | A1 | 8/2022 | Hatada | |

FOREIGN PATENT DOCUMENTS

| | | | |
|---|---|---|---|
| CN | 105093505 | A | 11/2015 |
| CN | 107450165 | A | 12/2017 |
| JP | H07-77656 | A | 3/1995 |
| JP | H09197277 | A | 7/1997 |
| JP | 2009186569 | A | 8/2009 |
| JP | 2013-218267 | A | 10/2013 |
| JP | 2014-142601 | A | 8/2014 |
| JP | 2016075741 | A | 5/2016 |
| JP | 2016102976 | A | 6/2016 |
| JP | 2016-151664 | A | 8/2016 |
| JP | 2017-215504 | A | 12/2017 |

OTHER PUBLICATIONS

Chinese Office Action issued by the China National Intellectual Property Administration on Jun. 19, 2025 in corresponding CN Patent Application No. 202210790082.9, with English translation.

* cited by examiner

OPTICAL SYSTEM AND IMAGE PICKUP APPARATUS HAVING THE SAME

BACKGROUND

Technical Field

The disclosure relates to an optical system, which is suitable for a digital video camera, a digital still camera, a broadcasting camera, a film-based camera, a surveillance camera, an in-vehicle camera, or the like.

Description of the Related Art

A telephoto type imaging optical system (telephoto lens) having a long focal length has conventionally been known. The long focal length is, for example, a focal length longer than a dimension of an effective imaging range. In general, the telephoto lens becomes larger and heavier as the focal length becomes longer. In addition, longitudinal and lateral chromatic aberrations particularly among various aberrations fluctuate during focusing.

Japanese Patent Laid-Open No. 2016-151664 discloses a telephoto lens that includes, in order from an object side to an image side, first to third lens units having positive, negative, and positive refractive powers, wherein the second lens remit is moved to the image side during focusing from an object at infinity to a short-distance object (closest or nearest object). The telephoto lens disclosed in JP 2016-151664 can be made light and satisfactorily correct various aberrations by properly setting a refractive power of a subunit in the third lens unit.

In the telephoto lens disclosed in JP 2016-151664, the second lens unit as the focusing unit includes a single positive lens and a single negative lens, or a single positive lens and two negative lenses. However, the focusing unit has a large number of lenses and becomes heavy, In addition, a driving system for the focusing unit needs a heavy load and it is difficult to realize high-speed focusing.

SUMMARY

The disclosure provides an optical system and an image pickup apparatus having the same, each of which can reduce the weight of the focusing unit An optical system according to one aspect of the disclosure includes, in order from an object side to an image side, a. first lens unit having a positive refractive power, a diaphragm, a second lens unit having a negative refractive power, and a. third lens unit having a positive refractive power. A distance between adjacent lens units is changed during focusing. The second lens unit is moved to the image side during focusing from an object at infinity to a short-distance object. The first lens unit includes a positive lens closest to an object and two or more negative lenses. The second lens unit consists of a single negative lens. The following conditional expressions are satisfied:

$$0.2 < LD1/LD < 0.4$$

$$BF/f < 0.25$$

where LD1 is a distance on an optical axis from a lens surface closest to the object of the first lens unit to a lens surface closest to an image plane of the first lens unit, LD is a distance on the optical axis from the lens surface closest to the object of the first lens unit to the image plane, f is a focal length of the optical system, and BF is a back focus of the optical system during focusing on the object at infinity, An image pickup apparatus according to another aspect of the disclosure includes the above optical system, and an image sensor configured to receive an image formed by the optical system.

Further features of the disclosure will become apparent from the following description of exemplary embodiments with reference to the attached drawings.

DESCRIPTION OF THE EMBODIMENTS

Figure 1:
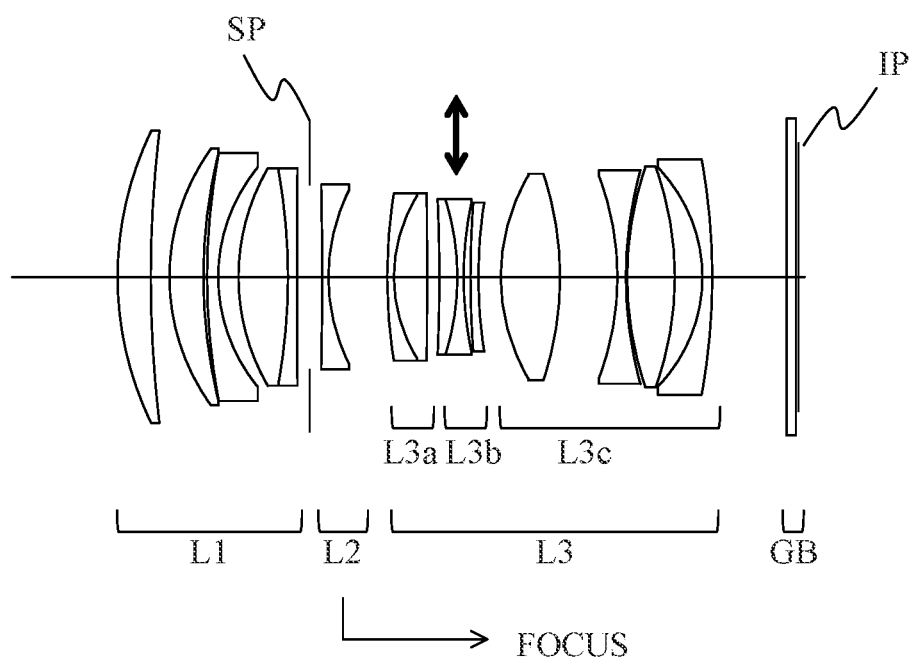
FIG. 1 is a sectional view of an imaging optical system according to Example 1 in an in-focus state on an object at infinity.
Figure 2A:
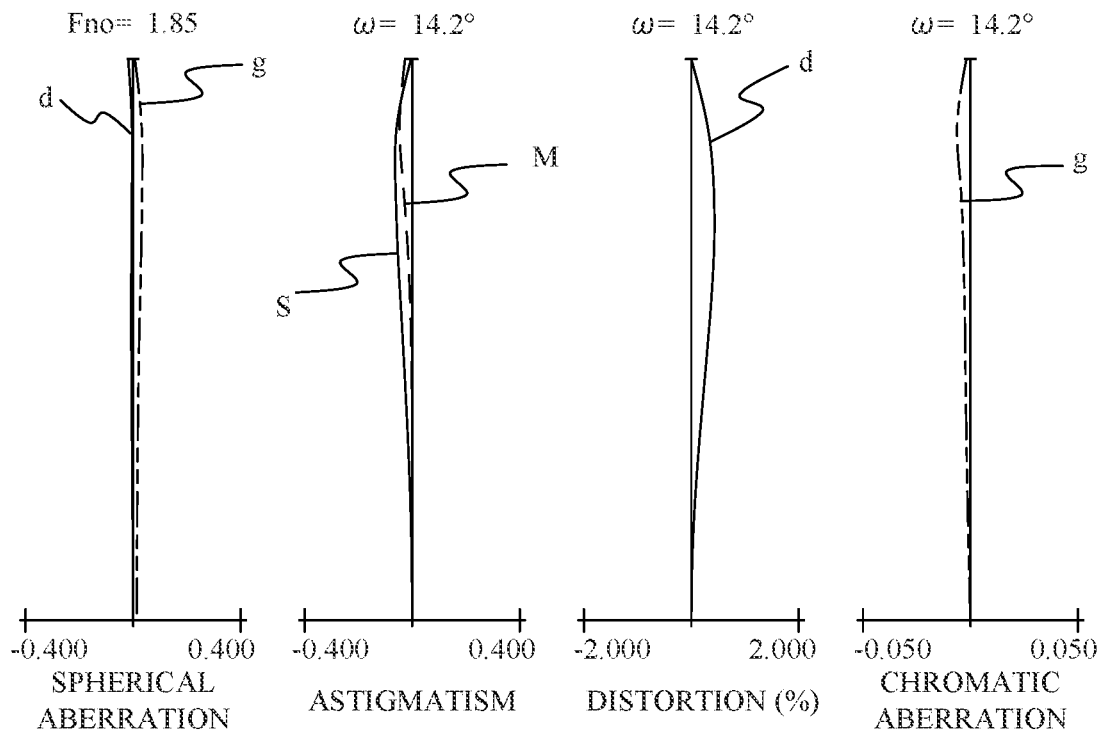
FIGS. 2A and 2B are aberration diagrams according to Example 1 in in-focus states on the object at infinity and a short-distance object.
Figure 2B:
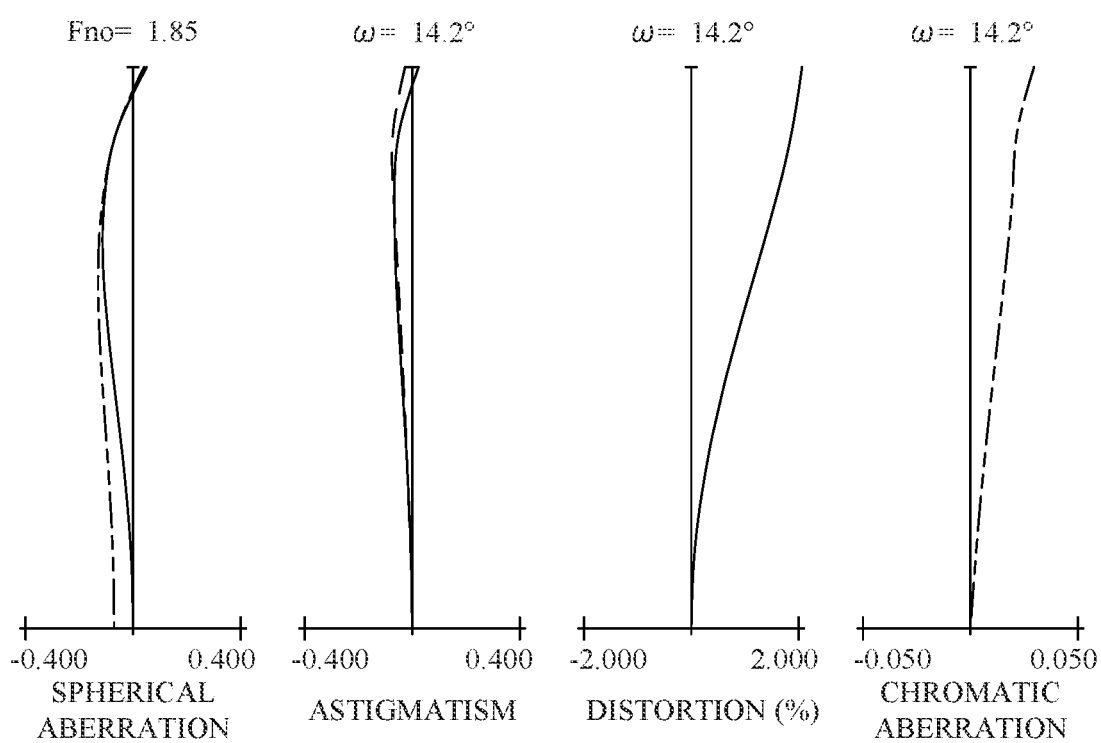
Figure 3:
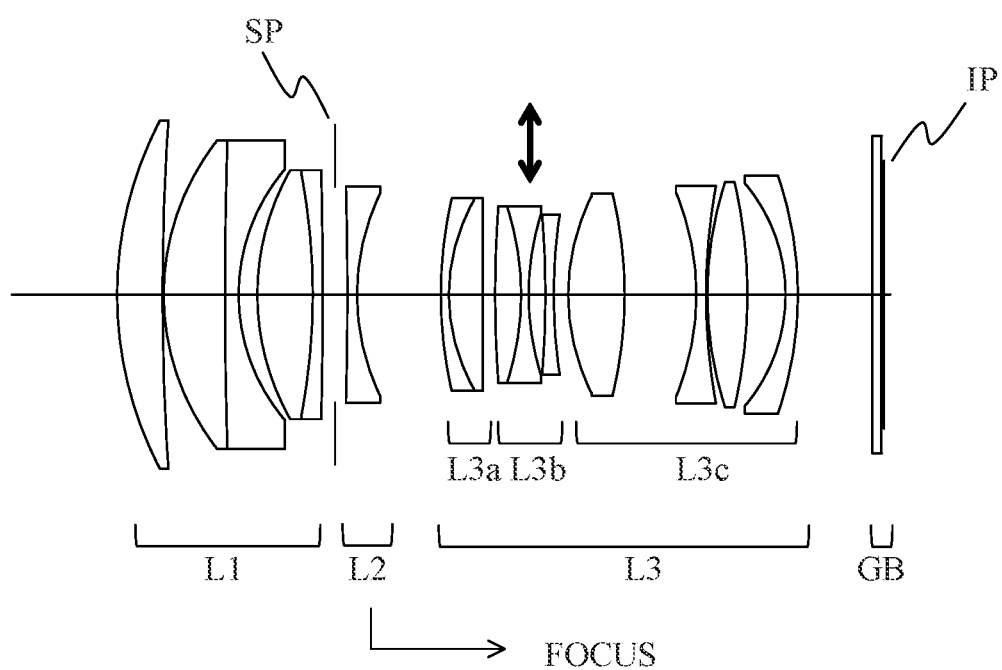
FIG. 3 is a sectional view of the imaging optical system according to Example 2 in an in-focus state on an object at infinity.
Figure 4A:
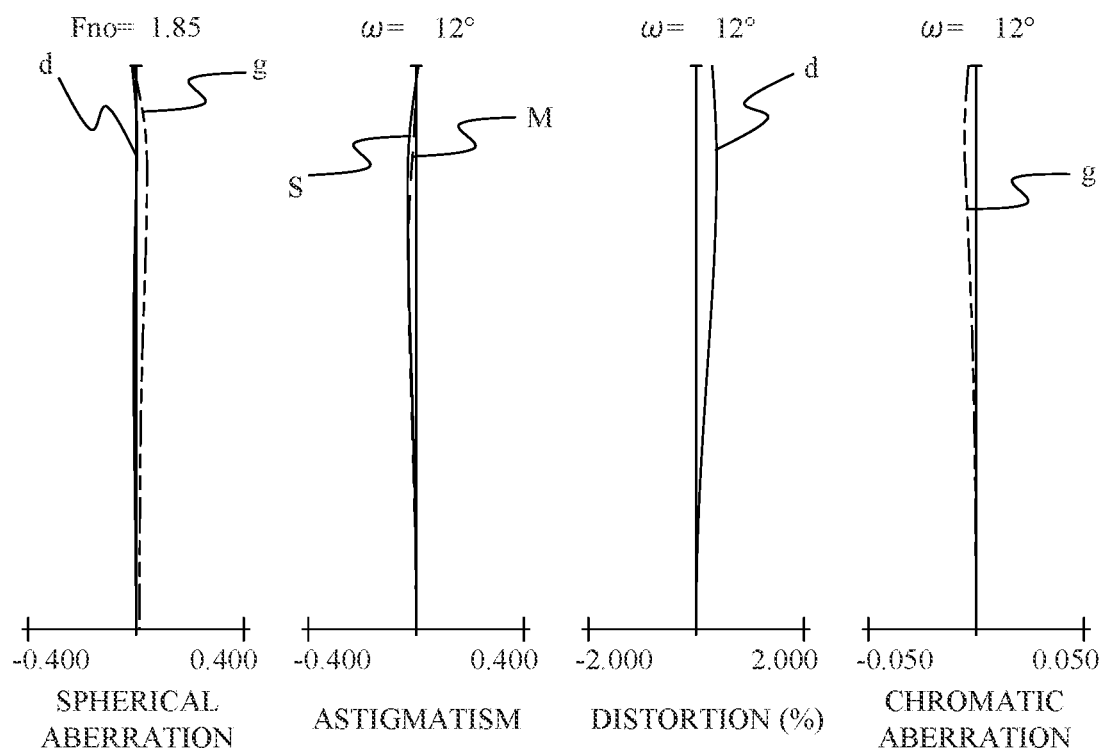
FIGS. 4A and 4B are aberration diagrams according to Example 2 in in-focus states on the object at infinity and a short-distance object.
Figure 4B:
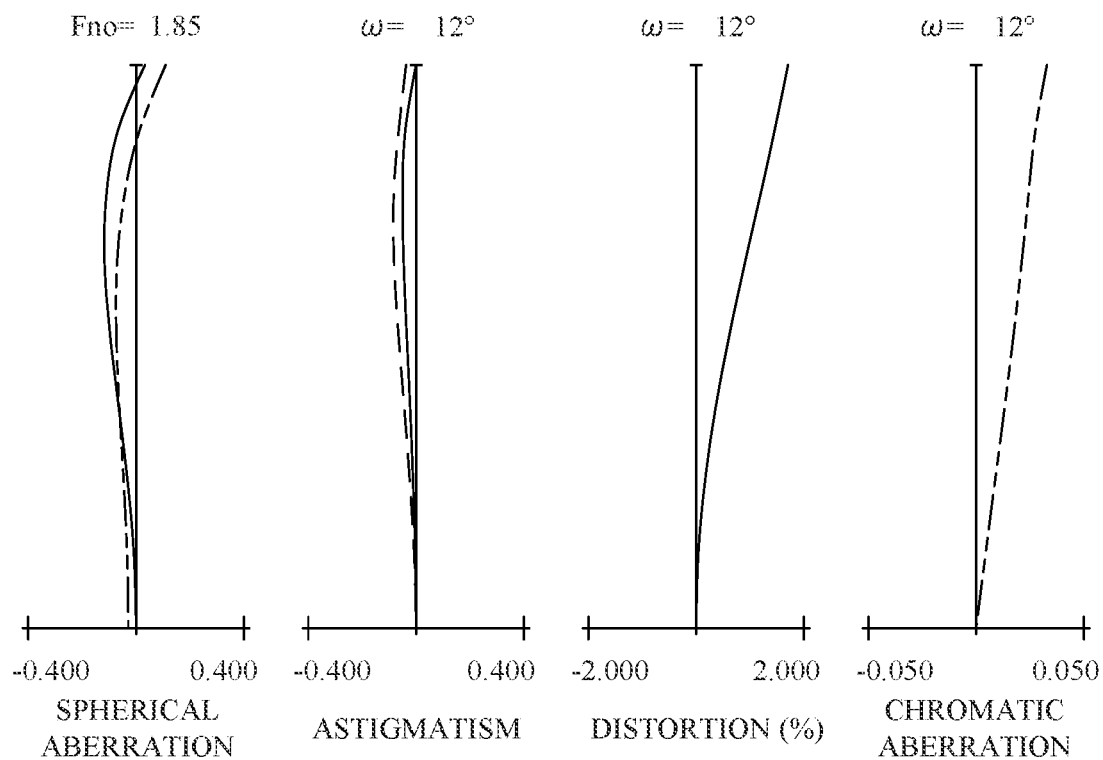
Figure 5:
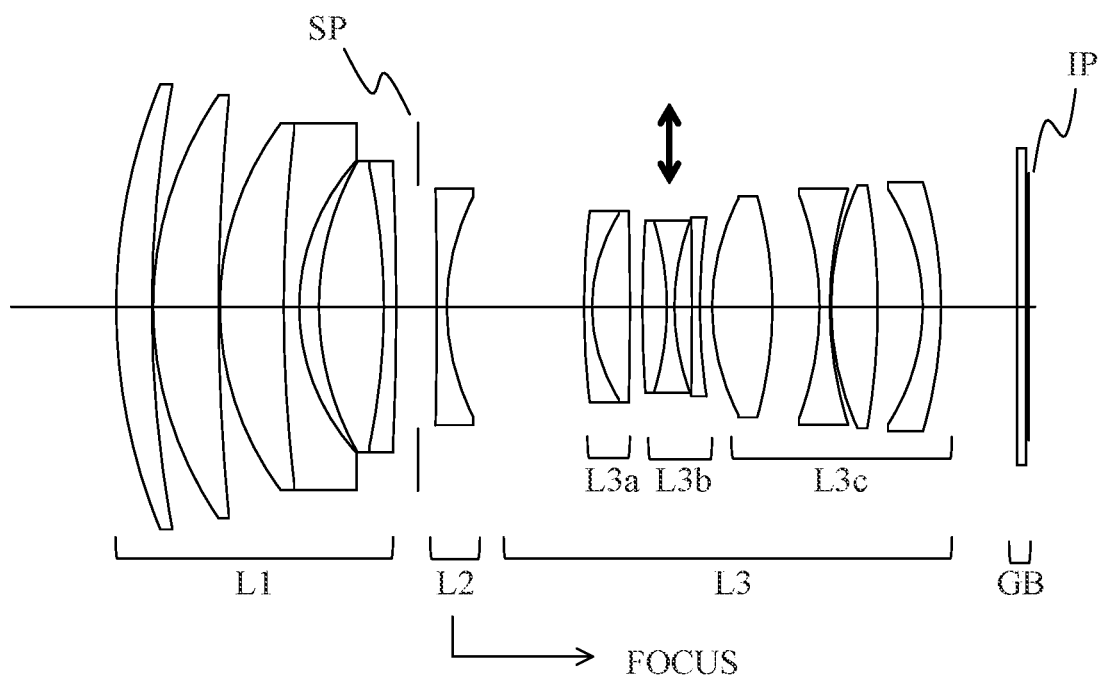
FIG. 5 is a sectional view of an imaging optical system according to Example 3 in an in-focus state on an object at infinity.
Figure 6A:
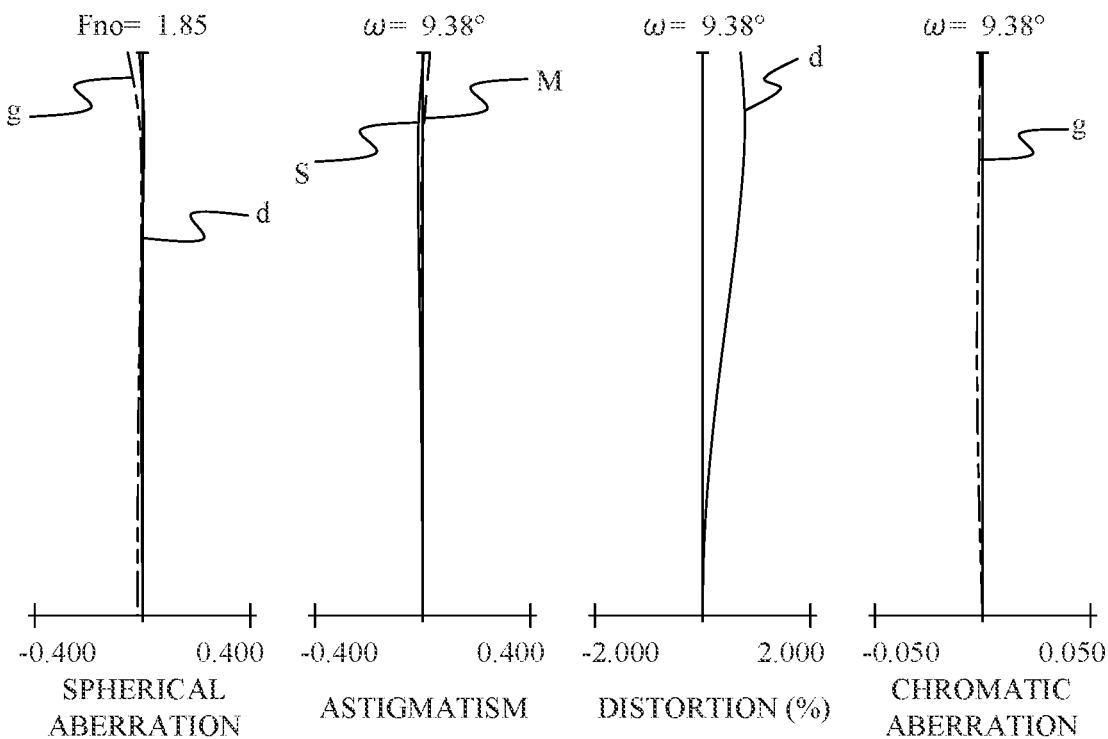
FIGS. 6A and 6B are aberration diagrams according to Example 3 in in-focus states on the object at infinity and a short-distance object.
Figure 6B:
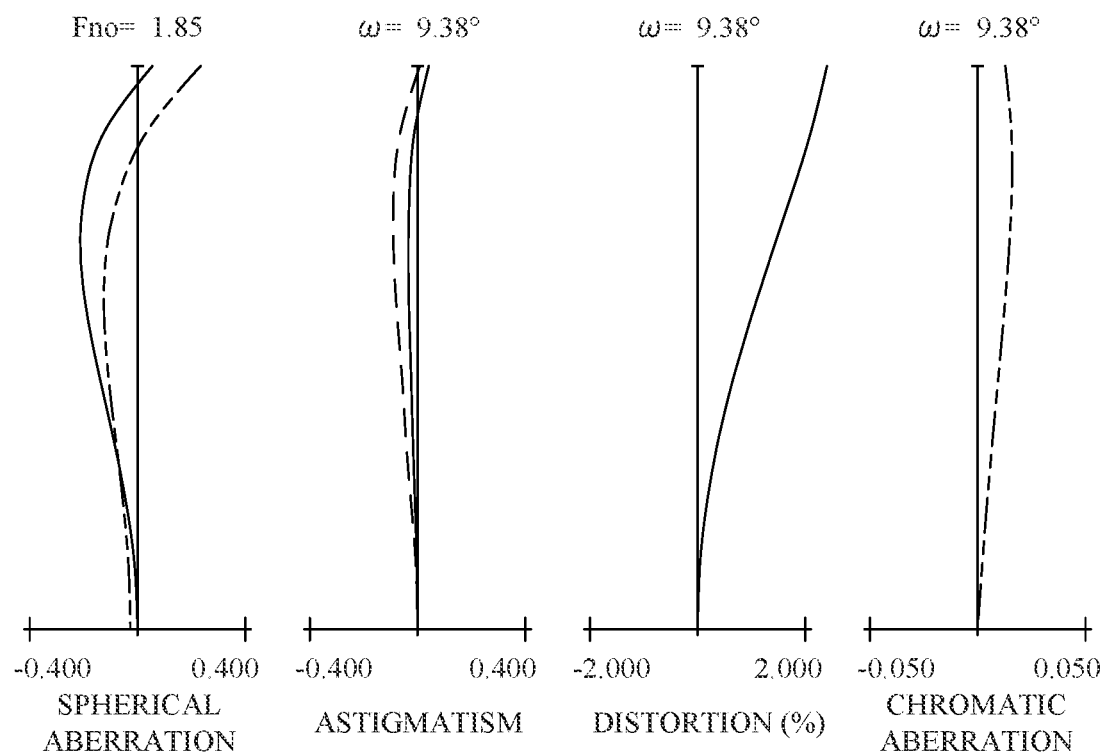
Figure 7:
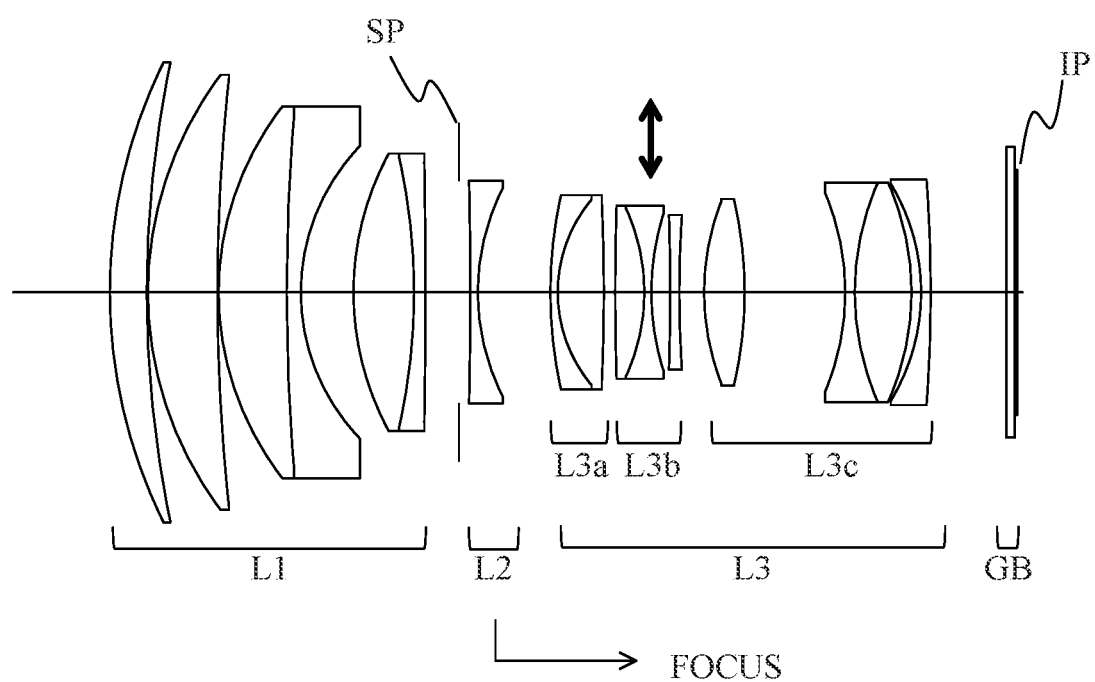
FIG. 7 is a sectional view of an imaging optical system according to Example 4 in an in-focus state on an object at infinity.
Figure 8A:
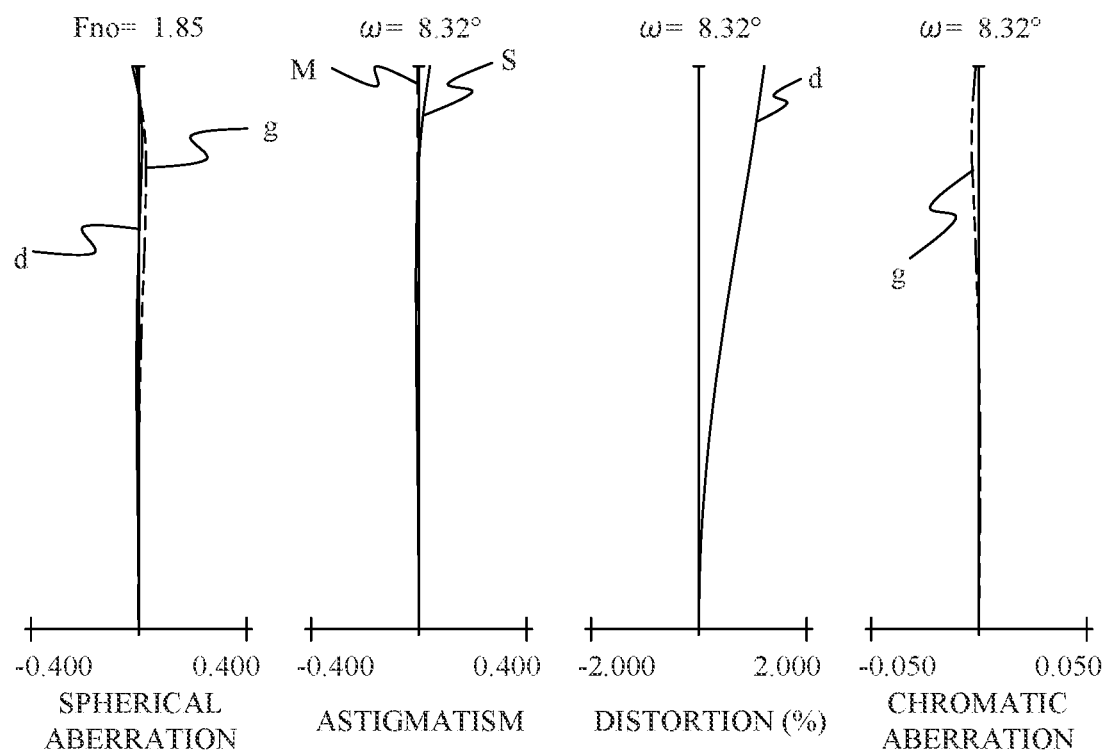
FIGS. 8A and 8B are aberration diagrams according to Example 4 in in-focus states on the object at infinity and the short-distance object.
Figure 8B:
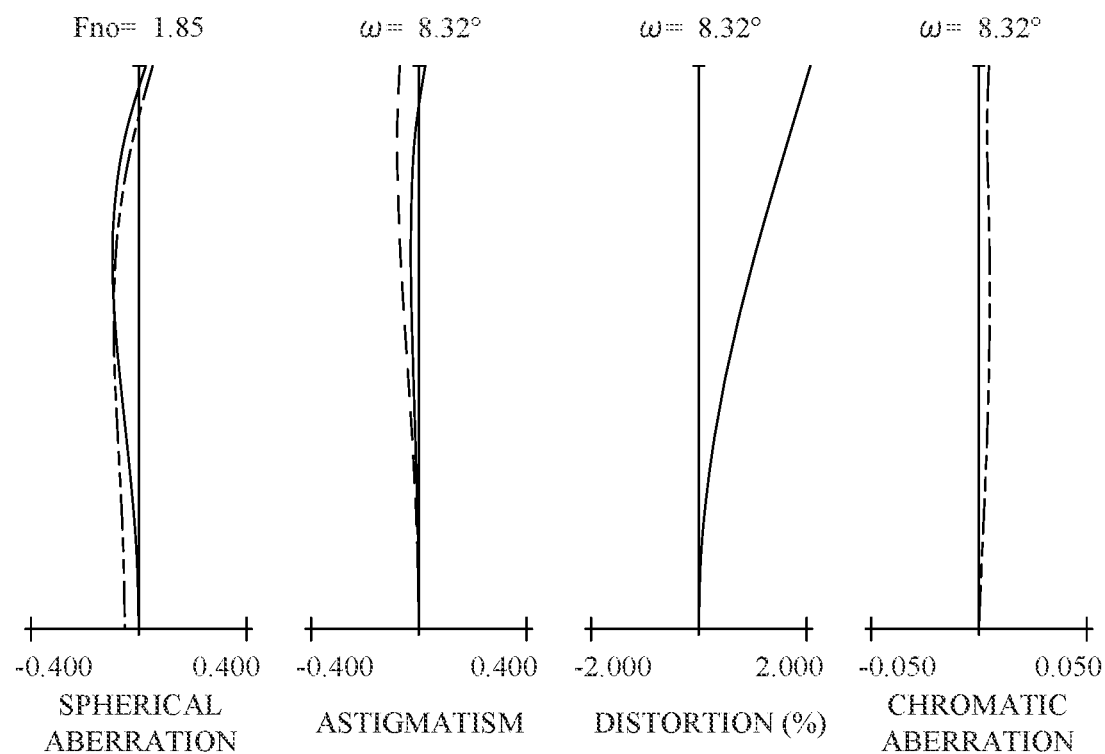

Referring now to the accompanying drawings, a detailed description will he given of embodiments according to the disclosure. Corresponding elements in respective figures will he designated by the same reference numerals, and a duplicate description thereof will be omitted.

FIGS. 1, 3, 5, and 7 are sectional views of imaging optical systems (optical systems) according to Examples 1 to 4 in an in-focus state on an object at infinity. The imaging optical system according to each example is an optical system for an image pickup apparatus such as a digital video camera, a digital still camera, a broadcast camera, a film-based camera, a surveillance camera, and an in-vehicle camera.

In each sectional view, a left side is an object side and a right side is an image side. The optical system according to each example includes a plurality of lens units. In this specification, a lens unit is a group of lenses that integrally move or stand still during focusing. That is, in the imaging optical system according to each example, a distance between adjacent lens units is changed during focusing. The lens unit may include one or more lenses.

The imaging optical system according to each example includes, in order from the object side to the image side, a first lens unit L1 having a positive refractive power, a diaphragm (aperture stop) SP, a second lens unit L2 having a negative refractive power, and a third lens unit L3 having a positive refractive power.

IP represents an image plane, and when the imaging optical system according to each example is used as an imaging optical system for a digital still camera or a digital video camera, an imaging plane of a solid-state image sensor (photoelectric conversion element) such as a CCD sensor or a CMOS sensor is placed on the image plane IP When the imaging optical system according to each example is used as an imaging optical system for a film-based camera, a. photosensitive plane corresponding to a film plane is placed on the image plane IP. GB represents an optical filter disposed on the object side of the image plane IP.

An arrow illustrated in each sectional view indicates a moving direction of a lens unit (focusing unit) during focusing from an object at infinity to a short-distance object. In the imaging optical system according to each example, the second lens unit L2 as a focusing unit is moved to the image side during focusing from the object at infinity to the short-distance object.

FIGS. 2A, 2B, 4A, 4B, 6A, 6B, 8A, and 8B are aberration diagrams of the imaging optical systems according to Examples 1 to 4. In each aberration diagram, FIGS. 2A, 4A, 6A, and 8A are aberration diagrams during focusing on the object at infinity, and FIGS. 2B, 4B, 6B, and 8B are aberration diagrams during focusing on the short-distance object.

In the spherical aberration diagram, Fno represents an F-number and indicates spherical aberration amounts for the d-line (wavelength 587.6 nm) and the g-line (wavelength 435.8 nm). In the astigmatism diagram, S indicates an astigmatism amount in the sagittal image plane, and M indicates an astigmatism amount in the meridional image plane. The distortion diagram illustrates a distortion amount for the d-line. The chromatic aberration diagram illustrates a chromatic aberration amount for the g-line. co is an imaged half angle of view (degrees).

Next follows a description of a characteristic configuration of the imaging optical system according to each example.

A lens closest to the object of the imaging optical system is a positive lens. That is, the first lens unit L1 includes a positive lens closest to the object. Thereby, the effect of converging light rays on the lens closest to the object can be enhanced, and a diameter of a light flux incident on the lens located on the image side of the lens closest to the object can be reduced, so that the optical system can have a small diameter and lightweight.

The first lens unit L1 includes two or more negative lenses. This configuration can satisfactorily correct a chromatic aberration, particularly a longitudinal chromatic aberration.

The second lens unit L2 consists of a single negative lens. This configuration can reduce the weight of the second lens unit L2 as the focusing unit, The second lens unit L2 is adjacent to the image side of the diaphragm SP. This configuration can reduce the weight of the second lens unit L2 as the focusing unit, and suppress fluctuations in lateral chromatic aberration during focusing.

The imaging optical system according to each example satisfies the following conditional expressions (1) and (2).

$$0.2 < LD1/LD < 0.4 \tag{1}$$

$$BF/f < 0.25 \tag{2}$$

Here, LD1 represents a distance on the optical axis from the lens surface closest to the object of the first lens unit L1 to the lens surface closest to the image plane of the first lens unit L1. LD represents a distance on the optical axis from the lens surface closest to the object of the first lens unit L1 to the image plane (the overall lens length hereinafter). f is a focal length of the imaging optical system. BF is a hack focus of the imaging optical system in the in-focus state on the object at infinity (a distance on the optical axis from the lens surface closest to the image plane of the imaging optical system to the image plane expressed by an air equivalent length).

The conditional expression (1) defines a ratio of the distance LD1 on the optical axis from the lens surface closest to the object of the first lens unit L1 to the lens surface closest to the image plane of the first lens unit L1 and the overall lens length LD. If the value is lower than the lower limit of the conditional expression (1), the weight of the imaging optical system can be easily reduced, but it becomes difficult to correct a spherical aberration and longitudinal chromatic aberration. If the value is higher than the upper limit of the conditional expression (1), it is advantageous from the viewpoint of aberration correction, but it becomes difficult to reduce the weight of the imaging optical system.

The conditional expression (2) defines a ratio between the back focus BF and the focal length f of the imaging optical system. if the value is higher than the upper limit of the conditional expression (2), the overall lens length becomes long.

Due to this configuration, the imaging optical system according to each example can reduce the weight of the focusing unit. The driving system for the focusing unit can have a smaller load, and the focusing speed can be increased. The imaging optical system according to each example can reduce the weight and satisfactorily correct various aberrations.

Even the configuration including four or more lens units can provide the similar effects by satisfying the above expressions.

The numerical ranges of the conditional expressions (1) and (2) may be replaced with those of the following conditional expressions (1a) and (2a).

$$0.23 < LD1/LD < 0.35 \tag{1a}$$

$$BF/f < 0.2 \tag{2a}$$

The numerical ranges of the conditional expressions (1) and (2) may be replaced with those of the following conditional expressions (1b) and (2b).

$$0.26 < LD1/LD < 0.35 \tag{1b}$$

$$BF/f = 0.17 \tag{2b}$$

Next follows a description of a configuration that may be satisfied in the imaging optical system according to each example.

The third lens unit L3 consists of, in order from the object side to the image side, a first subunit L3a having a positive refractive power, a second subunit L3b having a negative refractive power, and a third subunit L3c having a positive refractive power. The second subunit L3b as an image stabilizing unit may be moved in a direction including a component in a direction orthogonal to the optical axis during image stabilization (correction of image-position fluctuations caused by shake of the imaging optical system, etc.).

Next follows a description of conditions which the imaging optical system according to each example may satisfy. The imaging optical system according to each example may satisfy one or more of the following conditional expressions (3) to (7).

$$LD/f < 1.5 \quad (3)$$

$$0.50 < f1/f < 0.85 \quad (4)$$

$$-0.65 < f2/f < -0.35 \quad (5)$$

$$0.65 < f3/f < 0.95 \quad (6)$$

$$15 < vdG1 < 30 \quad (7)$$

Here, f1 is a focal length of the first lens unit L1. f2 is a focal length of the second lens unit L2. f3 is a focal length of the third lens unit L3. vdG1 is an Abbe number of the lens (positive lens) closest to the object of the imaging optical system.

The conditional expression (3) defines a ratio between the overall lens length LD and the focal length f of the imaging optical system. In the case where the conditional expression (3) is satisfied, the imaging optical system can be regarded as an imaging optical system having a long focal length. The imaging optical system according to each example may bean intermedium telephoto lens to a telephoto lens, and if the value is higher than the upper limit of the conditional expression (3), the imaging optical system is regarded as a lens having a short focal length.

The conditional expression (4) defines a ratio between the focal length f1 of the first lens unit L1 and the focal length f of the imaging optical system. If the value is lower than the lower limit of the conditional equation (4), the refractive power of the first lens unit L1 becomes large, which is advantageous for shortening the overall lens length, but it becomes difficult to correct a spherical aberration and longitudinal chromatic aberration. When the value is higher than the upper limit of the conditional expression (4), the refractive power of the first lens unit L1 becomes small and the overall lens length becomes long.

The conditional expression (5) defines a ratio between the focal length f2 of the second lens unit L2 and the focal length f of the imaging optical system. When the value is lower than the lower limit of the conditional expression (5), the refractive power of the second lens unit L2 becomes smaller, so that the focus sensitivity of the second lens unit L2l (a focus moving amount relative to a moving amount of the focusing unit) becomes smaller. The overall lens length becomes long. When the value is higher than the upper limit of the conditional expression (5), the refractive power of the second lens unit L2 becomes large, so that the focus sensitivity of the second lens unit L2 becomes large, and it is difficult to satisfy the optical performance during focusing.

The conditional expression (6) defines a ratio between the focal length f3 of the third lens unit L3 and the focal length f of the imaging optical system. if the value is lower than the lower limit of the conditional expression (6), the refractive power of the third lens unit L3 becomes large, which is advantageous for shortening the overall lens length, but it becomes difficult to correct the lateral chromatic aberration. When the value is higher than the upper limit of the conditional expression (6), the refractive power of the third lens unit L3 becomes small and the overall lens length becomes long.

The conditional expression (7) defines the Abbe number vdG1 of the lens closest to the object of the imaging optical system. If the value is lower than the lower limit of the conditional expression (7), chromatic aberration is excessively generated in the lens closest to the object of the imaging optical system. If the value is higher than the upper limit of the conditional expression (7), the chromatic aberration generated in the lens closest to the object of the imaging optical system becomes insufficient.

The numerical ranges of the conditional expressions (3) to (7) may he replaced with those of the following conditional expressions (3a) to (7a).

$$LD/f < 1.4 \quad (3a)$$

$$0.60 < f1/f < 0.81 \quad (4a)$$

$$-0.61 < f2/f < -0.40 \quad (5a)$$

$$0.7 < f3/f < 0.9 \quad (6a)$$

$$16 < vdG1 < 26 \quad (7a)$$

The numerical ranges of the conditional expressions (3) to (12) may be replaced with those of the following conditional expressions (3b) to (7b).

$$LD/f < 1.3 \quad (3b)$$

$$0.65 < f1/f < 0.76 \quad (4b)$$

$$-0.58 < f2/f < -0.46 \quad (5b)$$

$$0.74 < f3/f < 0.86 \quad (6b)$$

$$20 < vdG1 < 24 \quad (7b)$$

Next follows a description of numerical examples 1 to 4 corresponding to Examples 1 to 4, respectively.

In surface data according to each numerical example, r represents a radius of curvature of each optical surface, and d (mm) represents an on-axis distance (a. distance on the optical axis) between the m-th surface and the (m+1)-th surface, where in is a surface number counted from the light incident side. nd represents a refractive index of the optical element for the d-line, and vd represents an Abbe number of the optical element. The Abbe number vd of a certain material is calculated as follows:

$$vd = (Nd-1)/(NF-NC)$$

where Nd, NF, and NC are refractive indexes of the Fraunhofer line for the d-line (587.6 nm), F-line (486.1 nm), and C-line (656.3 nm).

In each numerical example, each of d, focal length (mm), F-number, and half angle of view (degrees) has a value when the imaging optical system according to each example focuses on the object at infinity. "Back focus" is a distance on the optical axis from the final lens surface (the lens surface closest to the image plane) to the paraxial image plane in terms of air equivalent length. The "overall lens length" is the length obtained by adding the back focus to the distance on the optical axis from the frontmost surface (the lens surface closest to the object) of the imaging optical system to the final surface. The "lens unit" may include one or more lenses.

Numerical Example 1

UNIT: mm

| Surface Data | | | | |
|---|---|---|---|---|
| Surface No. | r | d | nd | vd |
| 1 | 54.092 | 5.36 | 1.92286 | 20.9 |
| 2 | 198.248 | 3.02 | | |
| 3 | 35.481 | 5.48 | 1.59522 | 67.7 |

-continued

Surface Data

| Surface No. | r | d | nd | vd |
|---|---|---|---|---|
| 4 | 82.774 | 0.60 | | |
| 5 | 107.370 | 1.80 | 1.84666 | 23.8 |
| 6 | 27.867 | 3.28 | | |
| 7 | 35.143 | 8.00 | 1.59522 | 67.7 |
| 8 | −96.723 | 1.50 | 1.85478 | 24.8 |
| 9 | 5640.333 | 2.02 | | |
| 10(Diaphragm) | ∞ | (Variable) | | |
| 11 | −698.314 | 1.00 | 1.60311 | 60.6 |
| 12 | 31.166 | (Variable) | | |
| 13 | 83.514 | 1.10 | 1.84666 | 23.8 |
| 14 | 24.973 | 5.36 | 1.80400 | 46.5 |
| 15 | −1796.766 | 2.00 | | |
| 16 | −262.626 | 2.91 | 1.80810 | 22.8 |
| 17 | −41.460 | 1.00 | 1.62588 | 35.7 |
| 18 | 58.693 | 1.10 | | |
| 19 | 157.200 | 1.25 | 1.84666 | 23.8 |
| 20 | 74.459 | 3.64 | | |
| 21 | 32.506 | 9.60 | 1.56384 | 60.7 |
| 22 | −53.118 | 9.28 | | |
| 23 | −46.134 | 1.35 | 1.83481 | 42.7 |
| 24 | 64.875 | 0.20 | | |
| 25 | 55.064 | 7.72 | 2.00069 | 25.5 |
| 26 | −52.596 | 4.45 | | |
| 27 | −25.396 | 1.60 | 1.58913 | 61.1 |
| 28 | −105.676 | 12.0 | | |
| 29 | ∞ | 1.50 | 1.51633 | 64.1 |
| 30 | ∞ | 0.4 | | |
| Image Plane | ∞ | | | |

| | |
|---|---|
| Focal Length: | 85.40 |
| Fno | 1.85 |
| Half Angle of View (degree): | 14.22 |
| Image Height | 21.64 |
| Overall lens length | 109.49 |
| BF | 13.39 |

| | Infinity | −0.12 times |
|---|---|---|
| d10 | 2.00 | 8.33 |
| d12 | 9.49 | 3.16 |

Lens Unit Data

| Lens Unit | Starting Surface | Focal Length: |
|---|---|---|
| 1 | 1 | 63.27 |
| 2 | 11 | −49.44 |
| 3 | 13 | 70.23 |

Numerical Example 2

UNIT: mm

Surface Data

| Surface No. | r | d | nd | vd |
|---|---|---|---|---|
| 1 | 60.657 | 7.33 | 1.84666 | 23.8 |
| 2 | 409.336 | 0.20 | | |
| 3 | 40.298 | 9.91 | 1.49700 | 81.5 |
| 4 | 779.127 | 2.20 | 1.75520 | 27.5 |
| 5 | 31.274 | 3.03 | | |
| 6 | 40.780 | 8.97 | 1.49700 | 81.5 |
| 7 | −103.500 | 1.60 | 1.85478 | 24.8 |
| 8 | −806.192 | 2.00 | | |
| 9(Diaphragm) | ∞ | (Variable) | | |
| 10 | −591.831 | 1.53 | 1.60311 | 60.6 |
| 11 | 37.539 | (Variable) | | |
| 12 | 69.246 | 1.30 | 1.84666 | 23.9 |
| 13 | 30.666 | 5.47 | 1.80400 | 46.5 |
| 14 | 6151.241 | 2.00 | | |

-continued

Surface Data

| Surface No. | r | d | nd | vd |
|---|---|---|---|---|
| 15 | 186.758 | 4.22 | 1.80810 | 22.8 |
| 16 | −45.460 | 1.20 | 1.68893 | 31.1 |
| 17 | 43.170 | 2.73 | | |
| 18 | −148.577 | 1.30 | 1.56732 | 42.8 |
| 19 | 82.711 | 2.36 | | |
| 20 | 35.376 | 9.14 | 1.60311 | 60.6 |
| 21 | −69.076 | 11.60 | | |
| 22 | −42.878 | 1.55 | 1.62004 | 36.3 |
| 23 | 97.308 | 0.20 | | |
| 24 | 58.760 | 6.50 | 1.84666 | 23.8 |
| 25 | −79.431 | 6.16 | | |
| 26 | −27.942 | 2.00 | 1.66672 | 48.3 |
| 27 | −58.434 | 12.0 | | |
| 28 | ∞ | 1.50 | 1.51633 | 64.1 |
| 29 | ∞ | 0.4 | | |
| Image Plane | ∞ | | | |

| | |
|---|---|
| Focal Length: | 101.78 |
| Fno | 1.85 |
| Half Angle of View (degree): | 12.00 |
| Overall lens length | 123.44 |
| Image Height | 21.64 |
| BF | 13.39 |

| | Infinity | −0.11 times |
|---|---|---|
| d9 | 2.00 | 9.42 |
| d11 | 13.55 | 6.13 |

Lens Unit Data

| Lens Unit | Starting Surface | Focal Length: |
|---|---|---|
| 1 | 1 | 76.54 |
| 2 | 10 | −58.48 |
| 3 | 12 | 82.26 |

Numerical Example 3

UNIT: mm

Surface Data

| Surface No. | r | d | nd | vd |
|---|---|---|---|---|
| 1 | 94.549 | 5.77 | 1.92286 | 20.9 |
| 2 | 195.625 | 0.20 | | |
| 3 | 60.642 | 10.59 | 1.49700 | 81.5 |
| 4 | 341.785 | 0.20 | | |
| 5 | 49.687 | 10.32 | 1.49700 | 81.5 |
| 6 | 240.913 | 2.50 | 1.77047 | 29.7 |
| 7 | 34.682 | 3.19 | | |
| 8 | 47.542 | 10.50 | 1.49700 | 81.5 |
| 9 | −109.842 | 2.00 | 1.95375 | 32.3 |
| 10 | −479.909 | 3.50 | | |
| 11 (Diaphragm) | ∞ | (Variable) | | |
| 12 | −925.883 | 1.60 | 1.59349 | 67.0 |
| 13 | 38.997 | (Variable) | | |
| 14 | 124.810 | 1.30 | 1.80810 | 22.8 |
| 15 | 27.897 | 6.15 | 1.88300 | 40.8 |
| 16 | −553.811 | 2.00 | | |
| 17 | 195.915 | 3.98 | 1.80810 | 22.8 |
| 18 | −46.407 | 1.20 | 1.72342 | 38.0 |
| 19 | 39.388 | 2.84 | | |
| 20 | −800.989 | 1.25 | 1.84666 | 23.8 |
| 21 | 94.152 | 2.00 | | |
| 22 | 38.004 | 9.78 | 1.56384 | 60.7 |
| 23 | −65.608 | 7.60 | | |
| 24 | −50.619 | 1.65 | 1.48749 | 70.2 |
| 25 | 62.722 | 0.20 | | |
| 26 | 47.145 | 7.54 | 1.80810 | 22.8 |

-continued

| Surface Data | | | | |
|---|---|---|---|---|
| Surface No. | r | d | nd | vd |
| 27 | −114.410 | 7.29 | | |
| 28 | −35.060 | 2.98 | 1.90366 | 31.3 |
| 29 | −70.011 | 12.25 | | |
| 30 | ∞ | 1.50 | 1.51633 | 64.1 |
| 31 | ∞ | 0.4 | | |
| Image Plane | ∞ | | | |

| | |
|---|---|
| Focal Length: | 131.00 |
| Fno | 1.85 |
| Half Angle of View (degree): | 9.38 |
| Image Height | 21.64 |
| Overall lens length | 146.99 |
| BF | 13.64 |

| | Infinity | −0.25 times |
|---|---|---|
| d11 | 3.05 | 21.26 |
| d13 | 22.18 | 3.97 |

| Lens Unit Data | | |
|---|---|---|
| Lens Unit | Starting Surface | Focal Length: |
| 1 | 1 | 85.68 |
| 2 | 12 | −63.01 |
| 3 | 14 | 111.55 |

Numerical Example 4

UNIT: mm

| Surface Data | | | | |
|---|---|---|---|---|
| Surface No. | r | d | nd | vd |
| 1 | 91.618 | 6.52 | 1.84666 | 23.8 |
| 2 | 198.438 | 0.20 | | |
| 3 | 63.838 | 12.27 | 1.49700 | 81.5 |
| 4 | 353.293 | 0.20 | | |
| 5 | 53.417 | 12.00 | 1.49700 | 81.5 |
| 6 | 367.373 | 2.50 | 1.80100 | 35.0 |
| 7 | 37.173 | 9.29 | | |
| 8 | 51.330 | 10.70 | 1.49700 | 81.5 |
| 9 | −108.230 | 2.00 | 1.90366 | 31.3 |
| 10 | −1209.064 | 5.91 | | |
| 11 (Diaphragm) | ∞ | (Variable) | | |
| 12 | −884.729 | 1.30 | 1.56384 | 60.7 |
| 13 | 40.375 | (Variable) | | |
| 14 | 79.594 | 1.30 | 1.78470 | 26.3 |
| 15 | 25.477 | 8.14 | 1.75500 | 52.3 |
| 16 | −339.346 | 2.00 | | |
| 17 | 502.665 | 5.16 | 1.84666 | 23.8 |
| 18 | −35.225 | 1.20 | 1.80100 | 35.0 |
| 19 | 45.472 | 3.34 | | |
| 20 | −422.202 | 1.60 | 2.00330 | 28.3 |
| 21 | 193.743 | 4.36 | | |
| 22 | 43.822 | 7.17 | 1.59522 | 67.7 |
| 23 | −71.918 | 17.75 | | |
| 24 | −44.886 | 1.65 | 1.48749 | 70.2 |
| 25 | 47.885 | 10.04 | 1.85478 | 24.8 |
| 26 | −47.052 | 1.69 | | |
| 27 | −36.901 | 1.70 | 1.83481 | 42.7 |
| 28 | −257.883 | 13.30 | | |
| 29 | ∞ | 1.50 | 1.51633 | 64.1 |
| 30 | ∞ | 0.4 | | |
| Image Plane | ∞ | | | |

| | |
|---|---|
| Focal Length: | 148.00 |
| Fno | 1.85 |
| Half Angle of View (degree): | 8.32 |
| Image Height | 21.64 |
| Overall lens length | 159.49 |
| BF | 14.69 |

| | Infinity | −0.11 times |
|---|---|---|
| d11 | 2.00 | 6.36 |
| d13 | 12.81 | 8.45 |

| Lens Unit Data | | |
|---|---|---|
| Lens Unit | Starting Surface | Focal Length: |
| 1 | 1 | 101.56 |
| 2 | 12 | −68.45 |
| 3 | 14 | 110.87 |

Table 1 below summarizes various values in each numerical example.

TABLE 1

| | | Example 1 | Example 2 | Example 3 | Example 4 |
|---|---|---|---|---|---|
| | F | 85.40 | 101.78 | 131.00 | 148.00 |
| | Fno | 1.85 | 1.85 | 1.85 | 1.85 |
| | LD | 109.49 | 123.44 | 146.99 | 159.49 |
| | LD1 | 29.03 | 33.24 | 45.27 | 55.68 |
| | BF | 13.39 | 13.39 | 13.64 | 14.69 |
| | f1 | 63.27 | 76.54 | 85.68 | 101.56 |
| | f2 | −49.44 | −58.48 | −63.01 | −68.45 |
| | f3 | 70.23 | 82.26 | 111.55 | 110.87 |
| Exp. 1 | LD1/LD | 0.265 | 0.269 | 0.308 | 0.349 |
| Exp. 2 | BF/f | 0.157 | 0.132 | 0.104 | 0.099 |
| Exp. 3 | LD/f | 1.28 | 1.21 | 1.12 | 1.08 |
| Exp. 4 | f1/f | 0.741 | 0.752 | 0.654 | 0.686 |
| Exp. 5 | f2/f | −0.579 | −0.575 | −0.481 | −0.463 |
| Exp. 6 | f3/f | 0.822 | 0.808 | 0.852 | 0.749 |
| Exp. 7 | ν dG1 | 20.9 | 23.8 | 20.9 | 23.8 |

Image Pickup Apparatus

Figure 9:
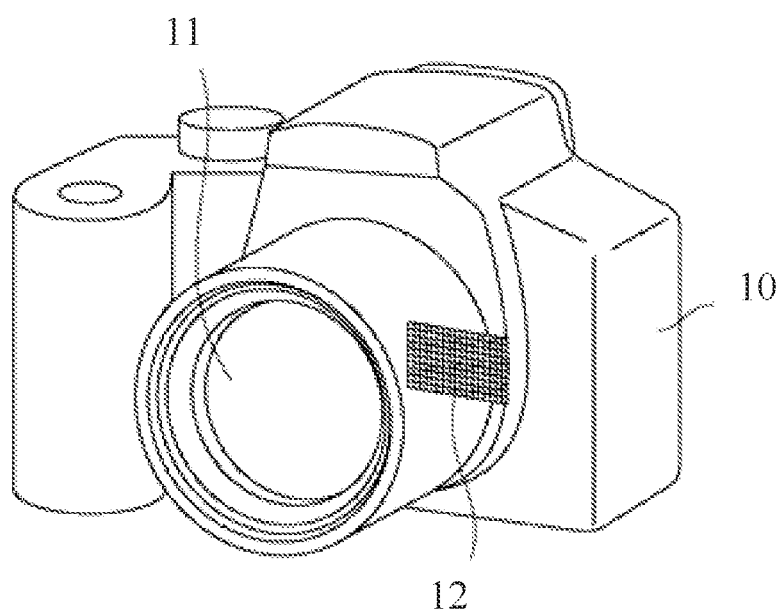
FIG. 9 is a schematic view of an image pickup apparatus.

Referring now to FIG. 9, a description will be given of an example of a digital still camera (image pickup apparatus) using the imaging optical system according to each example. In FIG. 9, reference numeral 10 denotes a camera body, and reference numeral 11 denotes any of the imaging optical systems described in Examples 1 to 4. Reference numeral 12 denotes a solid-state image sensor (photoelectric conversion element), such as a CCD sensor or a CMOS sensor, which is built in the camera body 10 and receives an optical image formed by the imaging optical system 11 and performs photoelectric conversion. The camera body 10 may be a so-called single-lens reflex camera having a quick turn mirror, or a so-called mirrorless (non-reflex) camera having no quick turn mirror.

Applying the imaging optical system according to each example to an image pickup apparatus such as a digital still camera in this way can provide an image pickup apparatus having a small lens.

Each example can provide an optical system and an image pickup apparatus having the same, each of which can reduce the weight of the focusing unit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-113299, filed on Jul. 8, 2021, which is hereby incorporated by reference herein in its entirety.

What is claimed is:

1. An optical system comprising, in order from an object side to an image side, a first lens unit having a positive refractive power, a diaphragm, a second lens unit having a negative refractive power, and a third lens unit having a positive refractive power,
  wherein each distance between adjacent lens units is changed during focusing,
  wherein the second lens unit is moved to the image side during focusing from an object at infinity to a short-distance object,
  wherein the first lens unit includes a positive lens closest to the object and two or more negative lenses,
  wherein the second lens unit consists of a single negative lens, and
  wherein the following conditional expressions are satisfied:

$$0.2 < LD1/LD < 0.4,$$

$$BF/f < 0.25, \text{ and}$$

$$15 < vdG1 < 26$$

where LD1 is a distance on an optical axis from a lens surface closest to the object of the first lens unit to a lens surface closest to an image plane of the first lens unit, LD is a distance on the optical axis from the lens surface closest to the object of the first lens unit to the image plane, f is a focal length of the optical system, BF is a back focus of the optical system during focusing on the object at infinity, and vdG1 is an Abbe number of the positive lens.

2. The optical system according to claim 1, wherein the following conditional expression is satisfied:

$$LD/f < 1.5.$$

3. The optical system according to claim 1, wherein the following conditional expression is satisfied:

$$0.50 < f1/f < 0.85$$

where f1 is a focal length of the first lens unit.

4. The optical system according to claim 1, wherein the following conditional expression is satisfied:

$$-0.65 < f2/f < -0.35$$

where f2 is a focal length of the second lens unit.

5. The optical system according to claim 1, wherein the following conditional expression is satisfied:

$$0.65 < f3/f < 0.95$$

where f3 is a focal length of the third lens unit.

6. The optical system according to claim 1, wherein the third lens unit consists of, in order from the object side to the image side, a first subunit having a positive refractive power, a second subunit having a negative refractive power, and a third subunit having a positive refractive power,
  wherein the second subunit is moved in a direction including a component in a direction orthogonal to the optical axis during image stabilization.

7. The optical system according to claim 1, wherein the first lens unit and the third lens unit are stationary during focusing.

8. The optical system according to claim 1, wherein the first lens unit includes a negative lens closest to the image side in the first lens unit.

9. An image pickup apparatus comprising:
  an optical system; and
  an image sensor configured to receive an image formed by the optical system,
  wherein the optical system includes, in order from an object side to an image side, a first lens unit having a positive refractive power, a diaphragm, a second lens unit having a negative refractive power, and a third lens unit having a positive refractive power,
  wherein each distance between adjacent lens units is changed during focusing,
  wherein the second lens unit is moved to the image side during focusing from an object at infinity to a short-distance object,
  wherein the first lens unit includes a positive lens closest to the object and two or more negative lenses,
  wherein the second lens unit consists of a single negative lens, and
  wherein the following conditional expressions are satisfied:

$$0.2 < LD1/LD < 0.4,$$

$$BF/f < 0.25, \text{ and}$$

$$15 < vdG1 < 26$$

where LD1 is a distance on an optical axis from a lens surface closest to the object of the first lens unit to a lens surface closest to an image plane of the first lens unit, LD is a distance on the optical axis from the lens surface closest to the object of the first lens unit to the image plane, f is a focal length of the optical system, BF is a back focus of the optical system during focusing on the object at infinity, and vdG1 is an Abbe number of the positive lens.

* * * * *